(No Model.) 2 Sheets—Sheet 2.
G. L. CAMPBELL.
BICYCLE SUPPORT AND LOCK.
No. 590,609. Patented Sept. 28, 1897.
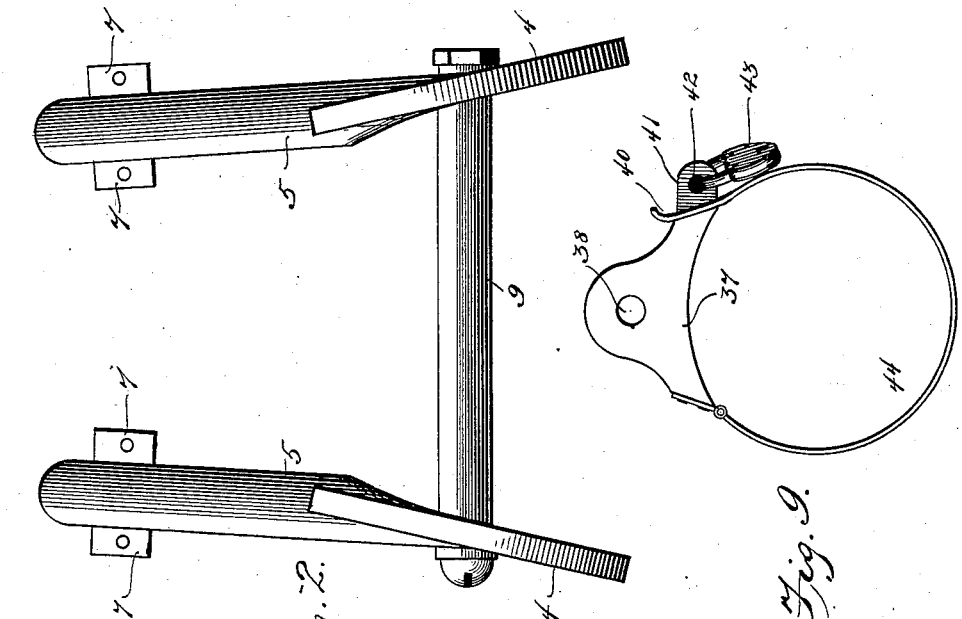
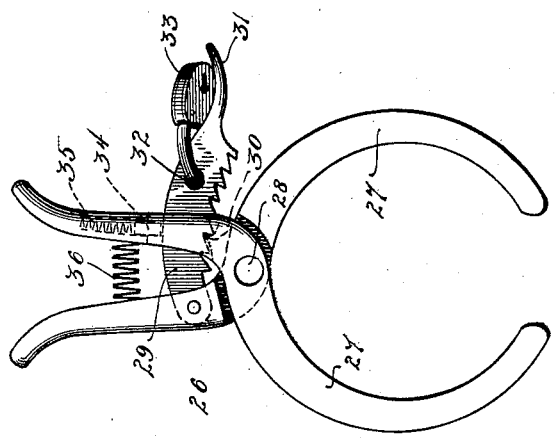
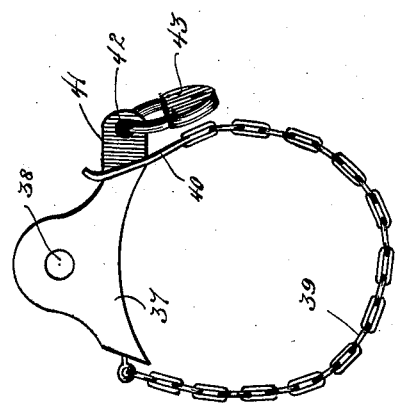
Witnesses
E. H. Monroe.
R. M. Smith.
Inventor
George L. Campbell
By his Attorneys,
C. A. Snow & Co.

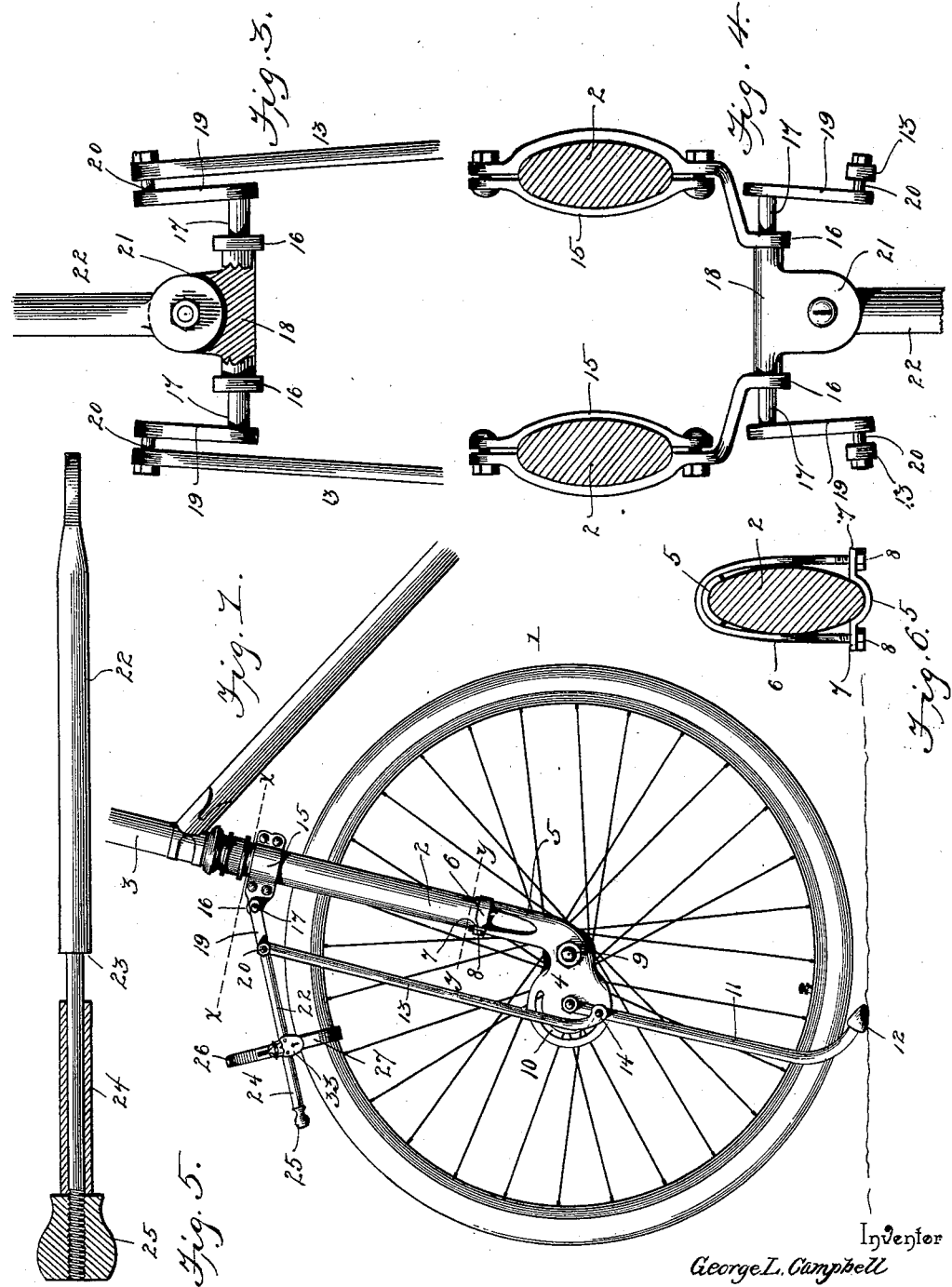

UNITED STATES PATENT OFFICE.

GEORGE LUMAN CAMPBELL, OF KINSMAN, OHIO.

BICYCLE SUPPORT AND LOCK.

SPECIFICATION forming part of Letters Patent No. 590,609, dated September 28, 1897.

Application filed August 14, 1896. Serial No. 602,780. (No model.)

*To all whom it may concern:*

Be it known that I, GEORGE LUMAN CAMPBELL, a citizen of the United States, residing at Kinsman, in the county of Trumbull and State of Ohio, have invented a new and useful Bicycle Support and Lock, of which the following is a specification.

This invention relates to bicycles, and has for its object to provide a simple and efficient device which may be applied to any ordinary safety-bicycle and which may be used either as a combined support and lock for the machine when not in use or simply as a lock, the supporting feature being capable of being omitted, if desired.

The device is so attached to the machine-frame and is of such a nature that it may be readily folded out of the way when not in use and secured in its folded position to the machine-frame, so as to preclude any possibility of the same moving into its operative position while the machine is in motion.

To the above end the invention consists in certain novel features and details of construction and arrangement of parts, as hereinafter fully described, illustrated in the drawings, and embodied in the claims.

In the accompanying drawings, Figure 1 is a side elevation of a sufficient portion of a bicycle to illustrate the application of the improved device thereto. Fig. 2 shows the supporting-brackets and the front-wheel axle in front elevation. Fig. 3 is a front elevation of a portion of the device, showing certain of the parts in their folded positions. Fig. 4 is a plan view of the same parts in their operative positions. Fig. 5 is a detail view of the lever-rod with its mountings in section. Fig. 6 is a detail horizontal section through one of the fork sides, showing the manner of attaching one of the brackets. Fig. 7 is a detail front elevation of the wheel clamp or lock. Fig. 8 shows a modified form of lock for light roadsters or racing-wheels. Fig. 9 shows another modification in the form of the lock.

Similar numerals of reference designate corresponding parts in the several figures of the drawings.

1 designates the front or steering wheel of a bicycle, 2 the front fork, and 3 the head or head-tube thereof.

In order to carry out the present invention, a pair of brackets 4 is employed, the same being secured to the lower ends of the front-fork sides 2. In order to effect a firm connection between said brackets and the fork sides, each bracket is provided with a socket portion 5, which is bifurcated, as shown, to receive the lower end of its respective fork side, and the bifurcated portions of said socket are clamped upon the fork-blade by means of a clip 6 of U shape, (shown in detail in Fig. 6,) the same extending around the socket and the fork side and having its threaded extremities passed through perforated ears 7 on the socket and held by means of nuts 8 or other suitable fasteners. The brackets 4 are provided with openings for the passage of the front-wheel axle 9.

The brackets 4 are deflected forward from the front-wheel axle 9 and have disk-shaped ends provided at or near their forward edges with segmental slots 10. Connected to the brackets 4 are supporting-rods 11, the same being provided at their free extremities with heads or buttons 12, which rest upon the ground when the support is in use. The inner ends of the rods 11 are pivotally connected to the brackets 4, concentrically to the slots 10. Links 13 connect pivotally with the rods 11 by means of pins or bolts 14, which pass through the lower extremities of said links and through the rods 12 and work in the segmental slots 10 as the support is thrown into and out of operative position.

Located upon each of the fork sides just under the fork-crown is a pair of clips 15. These clips embrace the fork sides and are clamped tightly thereon, as shown in Fig. 4, and at their front ends these clips have forwardly-extending ears 16, which have bearing-openings for the reception of oppositely-extending trunnions 17 on a pivot-block 18, located just over the front-wheel tire. Connected to the ends of the trunnions 17 are cranks 19, which are provided at their free ends with wrist-pins 20, upon which are pivotally mounted the upper ends of the links 13. By this construction when the pivot-block 18 is rocked upward the cranks 19 will lift upon the links 13 and the latter will in turn rock the supporting-rods 11 upward into their folded positions.

The pivot-block 18 is provided with spaced parallel ears 21, between which is pivotally mounted the inner end of a lever-rod 22. The outer or free end of this lever-rod is reduced to form a shoulder 23 and to receive a sleeve 24, which may be adjusted longitudinally on said lever-rod and held by means of a head or nut 25. Between the sleeve 24 and the shoulder 23 is placed a clamp or lock 26. (Best illustrated in Fig. 7.) This clamp preferably consists of a pair of jaws 27 of substantially semicircular form at their clamping ends, the same being crossed at intermediate points and formed with registering perforations 28, adapting them to be threaded upon the reduced portion of the lever-rod 22 and to be held between the shoulder 23 and sleeve 24, as shown in Fig. 1.

Connected pivotally to one of the jaws 27, in rear of their pivotal connection, is a rack bar or plate 29, the same passing through a slot in the opposing jaw and having its teeth arranged to engage a tooth or spur 30, located within the slot in the jaw above referred to. At its free end the rack-bar 29 is provided with a lip 31, by means of which it may be rocked on its pivotal connection, and at a suitable point the rack-bar has an opening 32 for the reception of a padlock 33, which when inserted therein prevents the fraudulent opening of the jaws 27. The engagement between the rack-bar 29 and the tooth or spur 30 is maintained automatically by means of a plunger 34, mounted in a recess in one of the jaws 7 and actuated against said rack-bar by means of an expansive spring 35, arranged in the same recess. When the rack-bar is disengaged, the jaws 27 are automatically moved apart by means of a spring 36, arranged between the heel ends of said jaws, as shown in Fig. 7.

By means of the construction above described it will be seen that as the lever-rod 22 is moved downward the links 13 will operate upon the rods 11 and throw the lower ends of the latter against the ground, so as to partially lift the front wheel 1, as shown in Fig. 1. The forwardly-projecting disk-shaped ends of the brackets 4 are reversely inclined, as clearly shown in Fig. 2, so that as the supporting-rods 11 are moved downward the lower ends thereof will be caused to move apart, the rods 11 thus being given a downward divergence. At the same time that the lever-rod 22 is moved downward the clamp or lock 26 is manipulated so as to bring its jaws around the wheel rim and tire, as shown in Fig. 1, and after the parts are in proper position the padlock 33 is applied, when the machine will be supported in upright position and the front wheel locked against rotation. When it is desired to use the wheel, the padlock 33 is removed, the jaws of the clamp disengaged from the wheel, and the lever-rod 22 vibrated upward. This, as will be readily understood, will rock the supporting-rods 11 upward in front of the fork sides 2, and as the rod 22 approaches the head or head-tube of the machine-frame the clamp 26 is given a half-turn upon the rod 22, so as to bring its jaws into position to embrace the said head. The jaws are now clamped around the head of the machine-frame in a manner similar to that described above in connection with the tire and rim, whereupon the whole device will be held in its folded position and effectually prevented from accidentally disengaging itself and falling. The pivot of the lever-rod 22 is at a right angle to the pivot of the block 18, so that the clamp 26 may readily be moved into any required position, either vertically or laterally.

The clamp 26, above described, is especially adapted for road-wheels, but where the device is to be used upon light roadsters or racing-machines a lighter form of lock may be employed.

Referring to Fig. 8, 37 indicates the main body of such a lock, the same having an opening 38, by which it may be placed upon the lever-rod 22 in lieu of the clamp 26. Attached to the body 37 at one side is a chain 39, adapted to be passed around the rim and tire of the wheel and provided at its free end with a hasp 40, which slips over an extension or ear 41, which is perforated, as at 42, to receive a padlock 43. In lieu of the chain 39 a metal band or ribbon 44 may be employed, the same being hingedly or otherwise connected at one end to the body 37 and slotted at its free end to engage over the ear 41.

If desired, the device may be used without the supporting attachment, comprising the parts 4, 11, and 13, and used simply as a bicycle-lock for preventing the machine from being stolen in the absence of the rider.

Instead of pivoting the supports 11 so that they will swing in longitudinal planes they may be fulcrumed at their upper ends, either on the brackets 4 or the ends of the axle 9, so that they will swing each in a transverse plane or laterally. Under this arrangement the links 13 will still connect said supports with the operating-lever 22 or rather with the cranks 19, the operation of the device being the same in either case. The construction first described is, however, the preferred one.

The device above described is very simple in construction and efficient in practice and is susceptible of various changes in the form, proportion, and minor details of construction, which may accordingly be resorted to without departing from the spirit or sacrificing any of the advantages of this invention.

Having thus described the invention, what is claimed as new is—

1. A combined support and lock for bicycles, comprising a lever, a supporting-rod pivoted so as to be folded, a connecting-link between said lever and rod, and a locking device mounted on said lever and adapted to be moved toward and away from the wheel and to be placed in engagement therewith, substantially as described.

2. The combination with a bicycle, of a lever pivoted to the frame thereof and having a reduced portion near its free end, a locking device mounted on such reduced portion and adapted to turn thereon, a sleeve mounted on the same portion, and means for adjusting and holding said sleeve, substantially as and for the purpose described.

3. The combination with a bicycle, of a bracket secured to the lower end of one of the fork sides and having a disk-shaped portion provided with a segmental slot, a supporting-rod pivoted to said bracket concentric to said slot, an operating-lever, a link interposed between said lever and rod and connected to the latter by a pivot which enters and works within the said slot, and a locking device mounted on the lever to turn thereon and adapted to lock the lever, when elevated, to the frame and, when depressed, to the wheel, substantially as described.

4. The combination with a bicycle, of a pivot-block secured thereto on a horizontal axis and having oppositely-projecting trunnions, an operating-lever fulcrumed on said block on the axis at right angles to the pivot of said block, cranks secured to said trunnions, supporting-rods pivotally connected to the machine-frame, connecting-links between said lever and rods, and a locking device mounted on the lever to turn thereon, and adapted to lock the lever, when elevated, to the frame and, when depressed, to the wheel, substantially as described.

5. A bicycle-lock comprising a pair of cross-jaws pivoted together at a point intermediate of their length, a rack-bar pivotally connected at one end to one of the jaws in rear of the pivot, the opposing jaw being slotted for the passage of said bar and provided with a projection to engage the teeth of the bar, a spring-actuated plunger in the slotted jaw to hold the bar in engagement with the projection, and a removable locking device in the projecting end of the rack-bar, substantially as described.

In testimony that I claim the foregoing as my own I have hereto affixed my signature in the presence of two witnesses.

GEORGE LUMAN CAMPBELL.

Witnesses:
ALLEN JONES,
WALTER W. DAVIS.